(12) United States Patent
Taillon

(10) Patent No.: US 8,047,579 B2
(45) Date of Patent: Nov. 1, 2011

(54) SELF-LUBRICATING SWIVELLING COUPLING

(75) Inventor: Michel Taillon, Quebec (CA)

(73) Assignee: Taimi R&D Inc., Quebec (CA)

( * ) Notice: Subject to any disclaimer, the term of this patent is extended or adjusted under 35 U.S.C. 154(b) by 549 days.

(21) Appl. No.: 11/642,943

(22) Filed: Dec. 21, 2006

(65) Prior Publication Data
US 2007/0176419 A1    Aug. 2, 2007

Related U.S. Application Data

(60) Provisional application No. 60/752,048, filed on Dec. 21, 2005.

(51) Int. Cl.
F16L 27/00    (2006.01)
(52) U.S. Cl. .......................... 285/280; 285/98
(58) Field of Classification Search .............. 285/94, 285/98, 272, 275, 278, 280, 281
See application file for complete search history.

(56) References Cited

U.S. PATENT DOCUMENTS

| | | | | |
|---|---|---|---|---|
| 637,541 | A * | 11/1899 | Wilkes | 285/281 |
| 785,871 | A | 3/1905 | Glazier et al. | |
| 929,734 | A | 8/1909 | Walder | |
| 1,190,209 | A | 7/1916 | York | |
| 1,228,733 | A * | 6/1917 | Aebli | 285/280 |
| 1,235,798 | A * | 8/1917 | Haskell | 285/281 |
| 1,638,224 | A * | 8/1927 | Vandergrift | 285/275 |
| 1,896,371 | A * | 2/1933 | Quarnstrom | 285/341 |
| 1,930,833 | A * | 10/1933 | Barrett | 285/281 |
| 2,323,701 | A * | 7/1943 | Barksdale | 239/246 |
| 2,382,375 | A * | 8/1945 | Allen et al. | 285/98 |
| 3,007,747 | A | 11/1961 | Isler | |
| 3,165,339 | A | 1/1965 | Faccou | |
| 3,510,155 | A * | 5/1970 | Jacobus | 285/98 |
| 3,533,557 | A * | 10/1970 | Ingram et al. | 285/280 |
| 3,840,264 | A * | 10/1974 | Bennett | 285/98 |
| 3,877,732 | A * | 4/1975 | Mohaupt | 285/94 |
| 3,936,079 | A * | 2/1976 | Ekman | 285/98 |
| 3,957,291 | A | 5/1976 | Edling et al. | |
| 4,124,206 | A * | 11/1978 | Price | 482/81 |
| 4,129,306 | A | 12/1978 | Konno et al. | |
| 4,154,551 | A * | 5/1979 | Petrie | 405/159 |
| 4,225,160 | A * | 9/1980 | Ortloff | 285/123.2 |
| 4,229,024 | A * | 10/1980 | Oberrecht et al. | 285/98 |
| 4,411,545 | A | 10/1983 | Roberge | |

(Continued)

FOREIGN PATENT DOCUMENTS

CA    1105801    7/1981
(Continued)

*Primary Examiner* — Aaron Dunwoody
(74) *Attorney, Agent, or Firm* — Jacobson Holman PLLC

(57) ABSTRACT

A self-lubricating swivelling coupling for interconnecting lines, includes a housing with internal surfaces defining a cavity. It also includes a male component, including a shank and a flange provided on the shank, insertable within the cavity to enable the flange to be abuttable on the internal surfaces. The coupling also includes a nut securable within the cavity, to abut axially via an internal axial projection on the flange, and to surround the shank, allowing the male component to rotate. The fluid leaks between the components to lubricate the coupling. Lines are connectable to ports to be swivellably interconnected without needle- or ball-bearings. There is high surface contact and support between the flange, shank and nut, to withstand and distribute forces. Hydraulic fluid is preferred. A seal-unit between the male component and the nut, and a slide-ring between the flange and the nut, are also preferred.

53 Claims, 13 Drawing Sheets

U.S. PATENT DOCUMENTS

| | | | |
|---|---|---|---|
| 4,512,410 A * | 4/1985 | Forester | |
| 4,669,760 A | 6/1987 | Hashish et al. | |
| 4,695,078 A * | 9/1987 | Anderson | 285/98 |
| 4,695,079 A * | 9/1987 | Weinhold | 285/278 |
| 4,716,934 A | 1/1988 | Levenez | |
| 4,998,755 A * | 3/1991 | Reeder | 285/181 |
| 5,018,546 A | 5/1991 | Carmack et al. | |
| 5,275,444 A | 1/1994 | Wythoff | |
| 5,409,324 A | 4/1995 | Johnson | |
| 5,462,230 A | 10/1995 | Van Ouwerkerk | |
| 5,507,534 A | 4/1996 | Reifenberger et al. | |
| 5,671,816 A | 9/1997 | Tibbitts | |
| 5,920,934 A | 7/1999 | Hannagan et al. | |
| 5,975,490 A | 11/1999 | Essman | |
| 6,123,268 A | 9/2000 | Chastine | |
| 6,220,636 B1 * | 4/2001 | Veloskey et al. | 285/261 |
| 6,299,219 B1 * | 10/2001 | Hoegger | 285/98 |
| 6,746,056 B2 | 6/2004 | Palmer | |
| 6,776,552 B2 | 8/2004 | Marunaka | |
| 2002/0041098 A1 | 4/2002 | Cooper | |
| 2005/0093295 A1 | 5/2005 | Byerly et al. | |
| 2005/0184510 A1 | 8/2005 | Langenfeld et al. | |

FOREIGN PATENT DOCUMENTS

| | | |
|---|---|---|
| CA | 2 254 188 | 5/2000 |
| DE | 3809062 A1 * | 9/1989 |
| DE | 195 42 562 | 5/1997 |
| GB | 2234307 A * | 1/1991 |
| JP | 03229091 A * | 10/1991 |
| JP | 04300490 A * | 10/1992 |

* cited by examiner

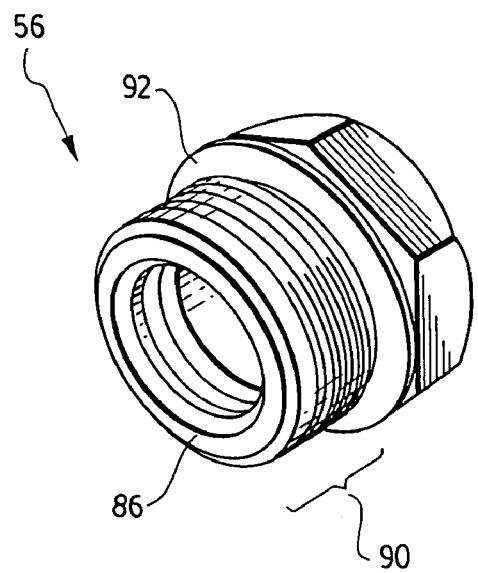
FIG. 14
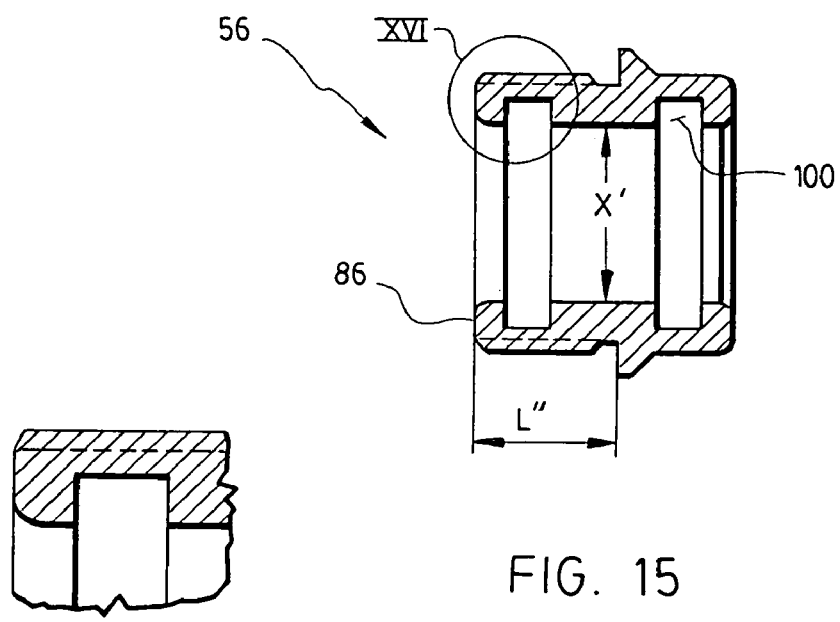
FIG. 15
FIG. 16

SELF-LUBRICATING SWIVELLING COUPLING

This patent application claims priority to U.S. patent application No. 60/752,048, filed Dec. 21, 2005, and incorporated by reference herein in its entirety.

FIELD OF THE INVENTION

The present invention generally relates to swivelling couplings for fluid lines and more specifically to self-lubricating swivelling couplings for industrial applications such as hydraulic systems.

BACKGROUND

Swivelling couplings are components that enable two or more lines (also called ducts, pipes, hoses or tubes) to be interconnected axially or angularly, and to eliminate torsion constraints that could affect their physical integrity or internal structure. Hydraulic lines, for instance, being for the most part constructed with braded or intertwined metallic wires or synthetic plastic material, are quite sensitive to torsion constraints.

The use of swivelling couplings is extremely widespread. Many equipment manufacturers and users in all types of industries have been and are regularly in contact with this type of product.

Various technological innovations have been brought forth in industrial fields that use couplings. For instance, in the field of hydraulics, modern heavy weight baring machines are high performing, and their operating pressures have been increased significantly in order to improve productivity. Also, with environmental norms becoming ever more stringent, it is desirable for technology pertaining to hydraulic systems to provide for the reduction or elimination of undesirable leaks and soil contamination.

Some significant challenges with swivelling couplings is the production of a coupling that is reliable, inexpensive, non awkward and non cumbersome. In fact, the size and encumbering aspect of couplings must be minimized, because fluid-containing lines are often regrouped in a restrained space and accessibility is a determining factor in the choice of swivelling couplings.

In addition, it is often very important to respect the original design assembly of lines in order to insure interchangeability of the coupling component as well as its feasibility and penetration into the market. This challenge is omnipresent for this type of product.

For hydraulic systems, most of the swivelling couplings currently available have a poor reputation, as their durability and lifetime is nominal (1000 hours approximatively), and their cost varies between $75.00 and $125.00 for the least complicated models. The market currently sees these components as a necessary evil because of their reduced longevity and the limited choices available. Swivelling couplings are offered by a limited number of manufacturers.

Various types of swivelling couplings are currently on the market and known in the art. Most of these couplings use bearings, often steel ball-bearings or needle-bearings, which are frequently combined with retaining rings. The retaining rings are predominantly composed of carbon spring steel, stainless steel or a copper alloy. The bearing assembly resists the operational constraints in play, which include a variety of forces, pressures, etc., and enable relative movement between the different parts of the coupling.

On a regular basis, such as in the forestry industry among others, these bearing-containing couplings are vertically positioned and are therefore required to support the weight of one or more lines (axial constraints) as well as endure lateral impacts and other forces during operation (radial constraints). The needle- and ball-bearings as well as the retaining rings used in the prior art resist and handle these constraints quite poorly. Premature wearing of the bearings—such as structural fragmentation of the balls or needles—greatly reduces the longevity of the coupling. In addition, in load-sensing hydraulic circuits, couplings are subjected to alternating pressures between, for example, 250 psi and 3000 psi on a regular basis. This periodic high pressure creates conditions that are particularly unsuitable for ball-bearing couplings.

Referring to FIG. 1 (prior art), in a standard swivelling coupling 20 with ball-bearings, the male 22 and female 24 components are provided with corresponding spherical grooves in which the ball-bearings 26 are housed to rotatably interconnect the components. A cap-screw 32 imprisons the balls within the groove. Two O-rings 28a, 28b and a back-up ring 30 are also arranged to cut the pressure of the lubricating fluid and ensure the watertightness of the system. The disadvantages of this coupling include, for instance, insufficient support surfaces of the spherical grooves for axial constraints, which may lead to premature wearing and/or marking of the balls; insufficient smooth support surfaces for radial constraints, which often causes premature wearing; insufficient internal lubrication, since the primary watertight joint slows and retards the fluid supply that lubricates the balls and the internal surfaces; and rapidly suffering from external leaks.

Referring to FIG. 2 (prior art), a swivelling coupling 34 with ball- and needle-bearings, includes a male component 36, a female housing 38, a fixing collar 40, usually twenty to twenty-five balls 42 housed in a groove, needle bearings 44, sealing joint(s) 46, and a torque joint 48. The disadvantages of this coupling 34 include, for instance, insufficient support surface of the groove for axial constraints, which often causes premature wearing and marking of the balls; insufficient internal lubrication, as the primary sealing joint slows the supply of hydraulic fluid to lubricate the balls and the internal surfaces, which often causes premature wearing; and rapidly noticeable external leaks.

Furthermore, despite the evolution in the design with the addition of a needle bearing, the technique employed to guide and seal the coupling assembly remains very similar to the ball-bearing type of coupling, and has the inherent problems thereof.

Other types of swivelling couplings are available and offer different assembly methodologies. The techniques are, for the most part, founded on the use of snap rings in order to resist axial forces, weights or pressures. This type of swivelling coupling is not recommended in vertical applications, because snap rings are not preferred or suitable in supporting the weights in play. The disadvantages of this coupling include, for instance, insufficient internal lubrication and structural weakness of the snap rings in vertical applications, which may cause serious disadvantages; frequent and rapid external leaks being perceptible; risk of contamination of the hydraulic system in the event that the snap ring, situated at the end of the male component, does not detach from the assembly and does not become well immersed in the circulation fluid within the line.

It should also be noted that some swivelling couplings without needle- or ball-bearings are found in the prior art.

U.S. Pat. No. 1,436,392 (GANZ) describes a swivel union including a coupling member having an outstanding flange which abuts on the perimeter rim of a main coupling member and is engaged by an overhanging flange of a coupling nut.

U.S. patent application Ser. No. 10/295,634 (SMITH et al.) describes a hydraulic swivelling connector including a swivel spud with tapering steps which receive various snap rings and is inserted into a connector which has corresponding tapering steps.

United Kingdom patent application No. 2,131,511 A (OSCARSSON) describes a swivel connector including male member inserted within a female member to enclose an O-ring seal against a shoulder to provide a liquid seal, and a collar cemented in place and enclosing the male member.

U.S. Pat. No. 3,877,732 (MOHAUPT) describes a high pressure fluid rotary coupling including a diamond-shaped connector by which fluid is able to leak through certain interstices of the coupling.

U.S. Pat. No. 5,005,877 (HAYMAN) describes a hydraulic coupling with a quick connect/disconnect mechanism, which includes a slidable collar engaging a locking body at cooperating angles to enable the lateral unlocking of the locking body.

In addition, U.S. Pat. Nos. 3,402,253, 3,799,440, 4,006,924, 4,101,148, 4,672,998, 5,174,614, 5,577,775, 5,651,567, 5,716,080, 6,406,065 and United States patent application published under Nos. 2002/0163185, 2003/0067161, and 2005/0140138, describe various couplings of the prior art.

Furthermore, many couplings known in the art are often designed to have dry internal components, or slightly lubricated components. Such traits often lead to functional problems or assembly inefficiencies.

In addition, many couplings known in the art present the disadvantage of deteriorating with time so that their performance decreases as the internal parts interact and become used and/or damaged.

As may easily appreciated from the above-mentioned analyses, the swivelling couplings found in the prior art present numerous disadvantageous, especially in heavy industry and the field of hydraulic systems, and there is presently a need for a new swivelling coupling that overcomes at least some of such disadvantages.

SUMMARY OF THE INVENTION

The present invention responds to the above-mentioned need by providing a swivelling coupling for interconnecting hydraulic lines.

Accordingly, the present invention proposes a self-lubricating swivelling coupling for providing a swivellable interconnection between first and second lines containing a fluid which provides lubrication. The swivelling coupling includes a housing which includes internal surfaces. The internal surfaces include at least one radial surface and at least one axial surface, said internal surfaces defining a cavity having an open end. The housing also includes a port having a bore therethrough in fluid communication with the cavity, the port being connectable to the first line. The coupling also includes a male component having a bore therethrough. The male component includes a shank portion having a port connectable to the second line, and a flange portion extending radially outward from the shank portion. The male component is insertable within the cavity of the housing to enable the flange portion to cooperatively abut on the at least one radial surface, and to enable the bore of the male component and the bore of the port of the housing to be in fluid communication. The flange allows a leak so that the fluid from the bore is partially leaked between the flange and the internal surfaces. The coupling also includes a nut securable within the cavity of the housing and surrounding the shank portion to radially restrain the same. The nut has a projection extending axially and internally into the cavity for axially restraining the flange and allowing the leak therebetween, the nut also allowing the male component to rotate with respect to the housing and the nut about a longitudinal axis of the shank portion, thereby enabling the first and second lines to be swivellably interconnected.

In a preferred embodiment of the swivelling coupling, the flange portion is integrally formed with the shank. Preferably, the flange portion is radially continuous and symmetrical, and is solid and disk-shaped and extends at about 90° with respect to the shank portion. The flange portion preferably has first and second external faces in opposed and parallel relationship, the first external face facing the projection of the nut and the second external face facing the internal axial surface of the housing.

Preferably, the bore of the male component and the bore of the housing each comprise an internal fluid junction that is opposed to the corresponding other junction, and the flange portion has an amount of axial play within the cavity. Preferably, the bore of the male component and the bore of the housing are collinear.

Preferably, under fluid pressure the first external face presses directly against the projection of the nut while being rotationally slidable with respect thereto, and the second external face is held in spaced relation to the internal axial surface. Also preferably, the projection of the nut and the first external face of the flange portion contact to form a fluid barrier to hinder the leak of the fluid therebeyond. Also, the flange portion preferably includes an outer circumferential surface, said outer radial surface being provided with at least one circumferential score.

In another preferred embodiment of the swivelling coupling, the coupling further includes at least one seal-unit provided between and abuttable against the nut and the shank portion, the at least one seal-unit sealing the fluid between the male component and the internal surfaces and between the male component and the nut. Preferably, the at least one seal-unit comprises at least one ring, and the nut further comprises at least one internal annular groove so that the at least one ring is partially insertable therein. Still preferably, the seal-unit includes an annular portion composed of plastic material, the annular portion having two opposite ends, and two rings disposed radially around the annular portion at the opposite ends thereof, and the nut further includes two internal annular grooves so that the two rings are respectively partially insertable therein.

Preferably, the amount of axial play is between about 0.005 and about 0.08 inches, and still preferably between about 0.03 and about 0.08 inches.

In another preferred embodiment of the coupling, it further includes a friction reducing slide-ring surrounding the shank portion and disposed between the projection of the nut and the first external face of the flange portion. Preferably, the slide-ring has a flat disk shape or an O-ring shape. Also preferably, the slide-ring is composed of a material chosen from the group consisting of Nylatron® material group, Nyloil™, Nycast™, Teflon and ceramic.

In yet another preferred embodiment, each of the junctions is openly tapered with respect to the corresponding other junction. Preferably, each junction is frustro-conical-shaped, preferably having an angle of about 60°.

Also preferably, the flange portion has an amount of radial play within the cavity to facilitate lubrication and rotation.

Preferably, the amount of radial play is between about 0.005 and about 0.08 inches and still preferably between about 0.015 and about 0.03 inches.

In another preferred embodiment, the flange portion has a convex curved surface facing the axial internal surface of the housing.

In still another preferred embodiment, the flange portion has a convex curved surface facing the axial internal surface of the housing.

In yet another preferred embodiment, the flange portion has an outer circumferential surface which is bevelled with respect to the radial internal surface of the housing.

In another preferred embodiment of the swivelling coupling, the flange is provided on the shank portion so that the male component is T-shaped in side plan view.

In another preferred embodiment of the swivelling coupling, the shank portion comprises a segment opposite the port thereof, the flange being provided between the segment and the port of the shank portion so that the male component is cross-shaped in side plan view.

Preferably, the shank portion is cylinder-shaped. It is also preferable that the shank portion of the male component is extendable through the nut so that the port of the shank portion is located beyond the nut. Preferably, the nut surrounds the shank portion from the port thereof to the flange portion.

Preferably still, the nut comprises external threads and the at least one radial surface comprises corresponding internal threads, to secure the nut within the cavity of the housing. It is also preferable that the open end of the cavity has a perimeter rim and the nut comprises a lip abuttable over said perimeter rim.

Preferably, the internal radial and axial surfaces of the housing are integrally formed.

It is also preferred that the coupling is used in a hydraulic circuit and the fluid consists of a hydraulic fluid, and still more preferred when the hydraulic circuit is a load-sensing type circuit.

The swivelling hydraulic coupling according to the present invention enables a large contact surface area between the male component the housing and the nut, giving rise to support surfaces which advantageously distribute the axial and/or radial forces to which the coupling may be subject in operation.

The distribution of force, especially between the male component and the nut surfaces, enables the coupling to be very robust. In operation, at lower pressures, there is a low coefficient of friction between the male component and the nut, which facilitates swivelling at low torques. At higher pressures, the coefficient of friction increases between the male component and the nut, and thus greater torque is required for swivelling. Alternating between low and high pressures, as is the case in load-sensing hydraulic circuits, is particularly well managed by the coupling of the present invention, since the elevated forces are born very well and minimal swivelling is required at high pressures. For constant high pressure applications, a slide-ring or another material bearing is preferred between the male component and the nut to facilitate swivelling at reasonable torques.

The coupling has a simple and economical design, and is easy to assemble, partly because it contains no ball- or needle-bearings. The coupling is robust and able to resist accidental damage in heavy-industry operations while providing a swivelling connection between lines. The coupling is self-lubricating, allowing the fluid within the bores to partially leak between the male component and the internal surfaces to improve the interaction of the support surfaces. In many embodiments, the support surfaces even evolve with the continued swivelling use of the coupling, which displays improved functionality with time given that the mutual wearing of the support surfaces smoothes their finish and thus facilitates their relative movement.

BRIEF DESCRIPTION OF THE DRAWINGS

FIG. 14 is a perspective view of the nut of the swivelling coupling according to a preferred embodiment of the present invention.

FIG. 15 is a longitudinal cut view of the nut of FIG. 14.

FIG. 16 is a close up view of area XVI of FIG. 15.

DESCRIPTION OF THE PREFERRED EMBODIMENT

Figure 1:
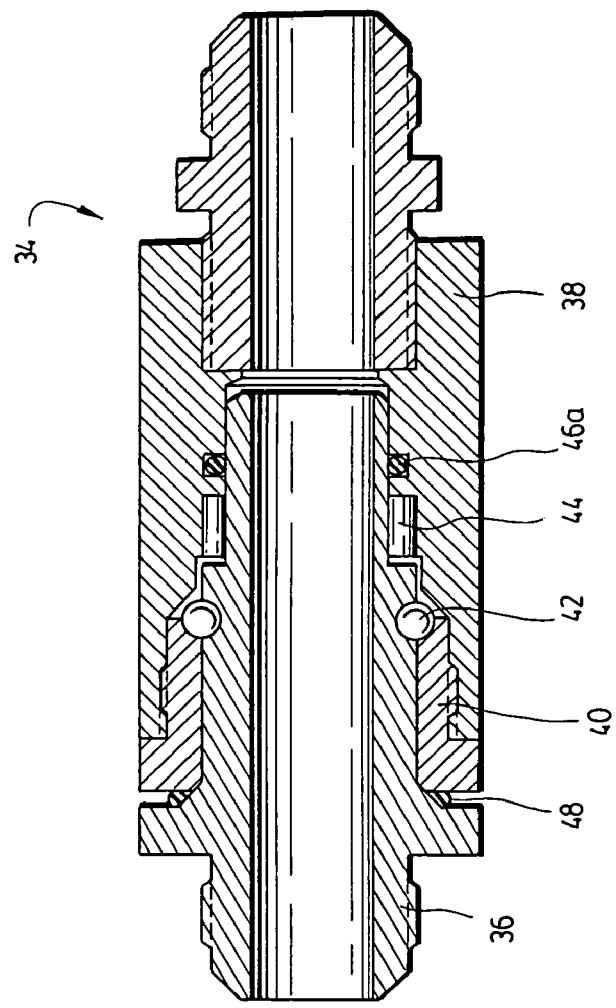
FIG. 1 (prior art) is a longitudinal cut view schematic of a swivelling coupling with ball-bearings, according to the prior art.
Figure 2:
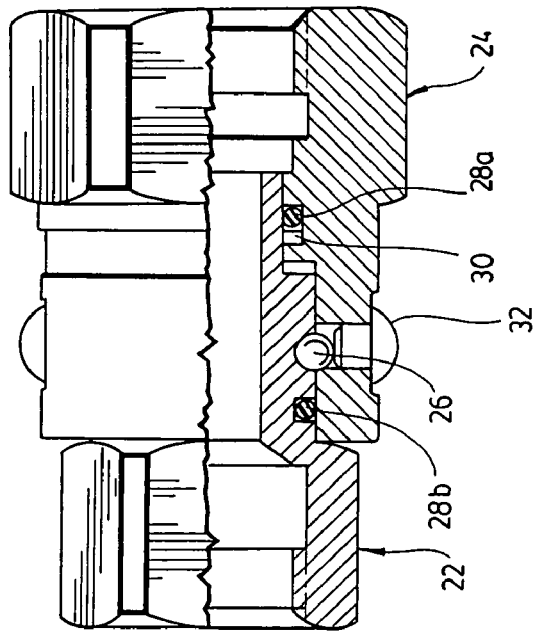
FIG. 2 (prior art) is a longitudinal cut view schematic of a swivelling coupling with ball- and needle-bearings, according to the prior art.

The present invention proposes a self-lubricating swivelling coupling for swivellably interconnecting lines containing a fluid. The swivelling coupling preferably interconnects hydraulic ducts transporting hydraulic fluid and thus is internally lubricated thereby.

By "lines" it is meant that the swivelling coupling may interconnect two or more fluid-containing, fluid-transmitting or fluid-receiving equipments. Lines are often called ducts, pipes, tubes, hoses or conduits. However, since lines often transport fluid to a component of a machine, which is particularly the case in hydraulically operated machinery, it should be noted that one of the "lines" interconnected by the swivelling coupling may be embodied by a fluid-receiving machine component.

By "self-lubricating" it is meant that the fluid transmitted through or housed within the lines is able to partially leak at some point during operation between certain components of the swivelling coupling to thereby facilitate its swivelling capacity. This does not preclude the use of additional lubricants or friction-reducing components such as a bearing ring, which may be desirable in particular applications, for example at extreme pressures or for a frequent rotation of the coupling. More regarding the lubrication of the coupling will be discussed in relation to its particular components hereinbelow.

The "fluid" stored or transmitted through the lines and which lubricates the coupling, is preferably a hydraulic fluid. Such hydraulic fluids are generally known in the art and are often based on chemicals such as glycol esters, ethers, castor oil or silicone, or a variety of other oils depending on the application. The hydraulic fluid is permitted to lubricate the necessary moving parts of the coupling by partially leaking from the bores into the interstices of the coupling. The swivelling coupling of the present invention is particularly useful in hydraulic systems that are load-sensing circuits. In alternative applications, the coupling may contain another fluid such as water or other aqueous liquids. In these applications, which most often involve lower pressures and different flow regimes than in hydraulic systems, the fluid is also enabled to partially leak to internally lubricate the coupling. Of course, the most appropriate fluids are those that offer high lubricating capacity; however, other fluids are also possible especially when the operating conditions and additional material bearings facilitate the swivelling.

It should also be understood that the fluid systems in which the coupling may be incorporated, are often very complex. It is thus difficult to characterize various properties—such as the flow regime, the force distribution, and the pressures—within the coupling. Many systems are dynamic or semi-dynamic, which further complicates the matter. For instance, load-sensing hydraulic circuits have fluctuations in fluid pressure which are rapid and dramatic, which in turn may cause complex effect within the coupling. The movement of the fluid and of the coupling components, as well as the fluid pressure and the other external constraints on the lines, result in various friction coefficients, for example, between the coupling components. The interaction of the coupling components is greatly dependant on a variety of complex, interrelated factors. Certain specific applications will be discussed hereinbelow, but it should be stressed that the specific operation of the coupling and its components may differ depending on the particular application.

It should also be understood that the swivelling coupling of the present invention does not require or include ball-bearings, needle-bearings or roller-bearings. These shape-based bearings present a myriad of disadvantages, as was discussed hereinabove in the BACKGROUND section. The swivelling does include fluid bearings, i.e. the lubricating fluid, and may also include material bearings such as a slide-ring in certain preferred embodiments, as will be discussed hereinbelow. It should be noted that the fluid bearings and material bearings do not hinder the high support surfaces of the components of the coupling and thus are in accordance with the present invention, while ball- and needle-bearings greatly influence the support surfaces and the force distribution within the coupling and imply other disadvantages.

Referring to the preferred embodiment illustrated in FIGS. 3 to 7 and 17, the hydraulic swivelling coupling 50 of the present invention provides a swivellable interconnection between two lines (not shown). The coupling 50 preferably has a construction enabling the coaxial interconnection of two lines, but it should be understood that the coupling 50 may be adapted to provide a different interconnection, such as a 90° connection or an oblique connection.

Figure 18A:
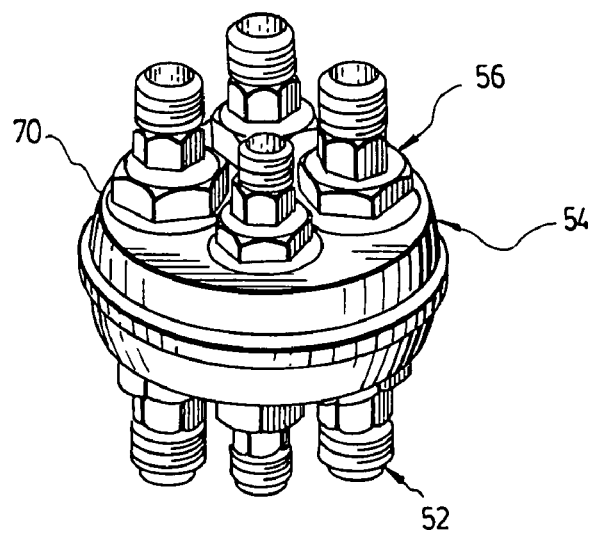
FIGS. 18a and 18b are top perspective views of the swivelling coupling according to still another preferred embodiment of the present invention.
Figure 18B:
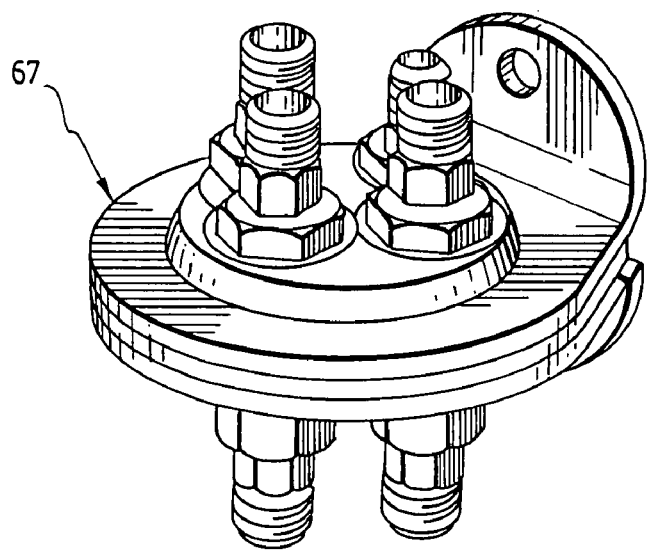
Figure 19:
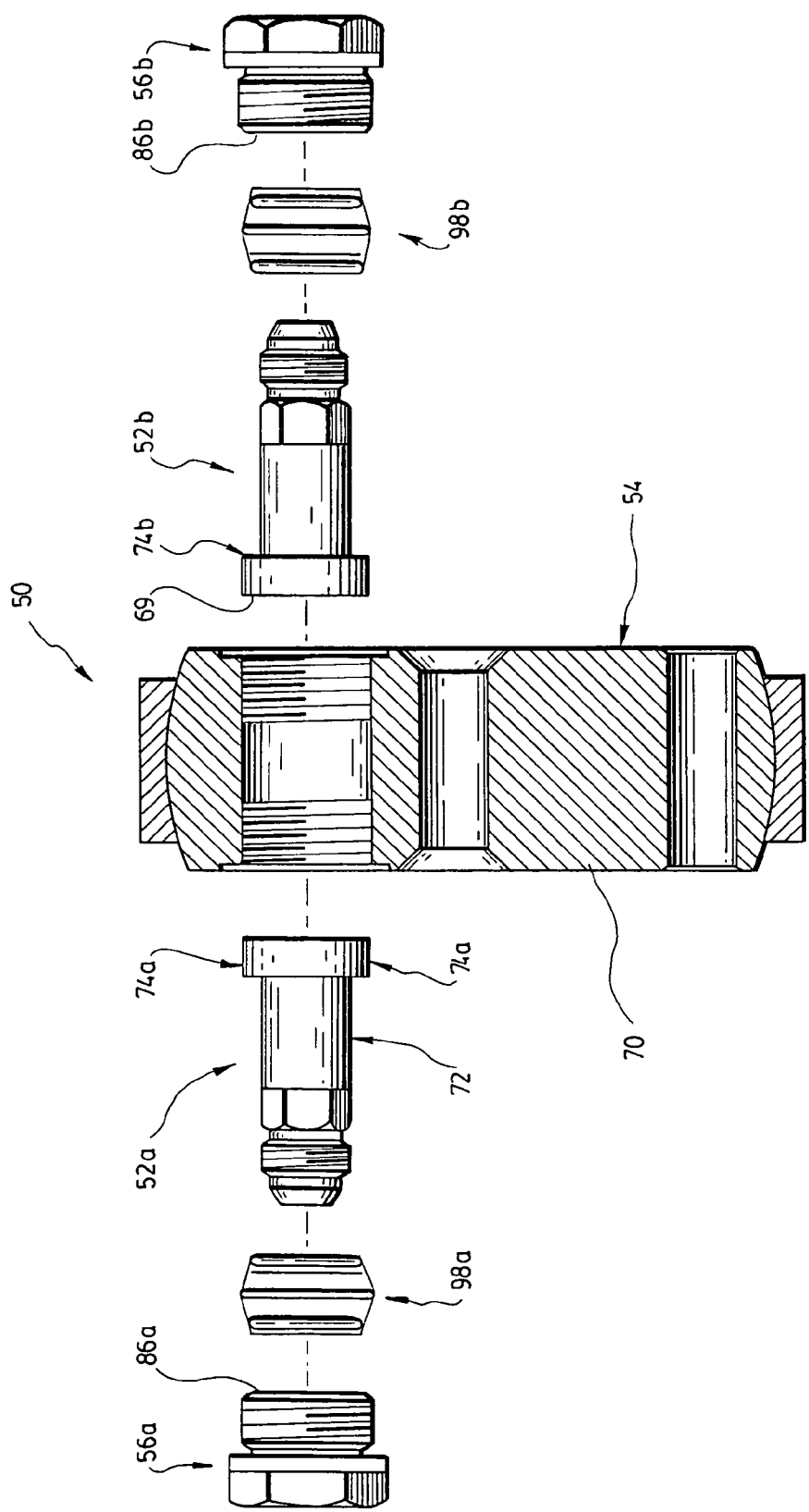
FIG. 19 is an exploded side plan view of part of the swivelling coupling of FIG. 18.

Referring to another preferred embodiment illustrated in FIGS. 18 and 19, the coupling 50 may also interconnect more than two lines. More on this embodiment will be discussed hereinbelow.

Referring back to FIGS. 3 to 5 and 17, the swivelling couplings 50 enables a considerable increase in the percentage of support surfaces (also called "push surfaces" or "abutting surfaces") between the components. The swivelling coupling is very robust, whether the operational forces in play are axial or radial (which is not the case for prior art couplings). The swivelling coupling 50 is simple, reliable, inexpensive to produce and to assemble, and is very easy to maintain in a good condition, because it can be easily dismantled. As can be appreciated by comparing the prior art with the present innovation, many technological advantages have been realised.

Referring still to FIGS. 3 to 5 and 17, the swivelling coupling 50 includes three main components regardless of whether the setup is axial or angular or another arrangement known to a person skilled in the art; a male component 52 which is held between a housing 54 and a nut 56.

Figure 13:
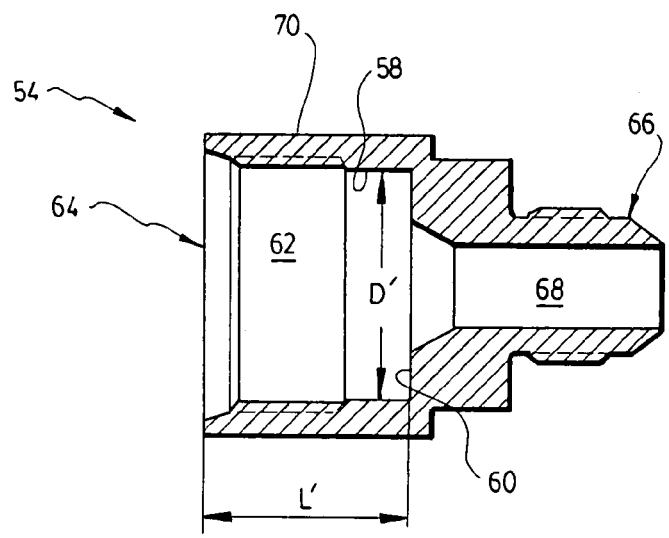
FIG. 13 is a longitudinal cut view of the housing of FIG. 12.

Referring to FIG. 13, the housing 54 includes internal surfaces including at least one radial surface 58 and at least one axial surface 60. The internal surfaces 58, 60 define a cavity 62 having an open end 64. It is through the open end 64 that the male component 52 is insertable. It should be understood that the housing 54 may also include a plurality of cavities in which a corresponding number of male components and nuts may be introduced. The housing 54 also includes a port 66 having a bore 68 therethrough in fluid communication with the cavity 62. This port 66 is connectable to a line. Accordingly, the port 66 may have threads or a connection notch or collar to connect to the line. Also, the housing 54 may conceivably have a plurality of ports connectable to corresponding lines.

Figure 4:
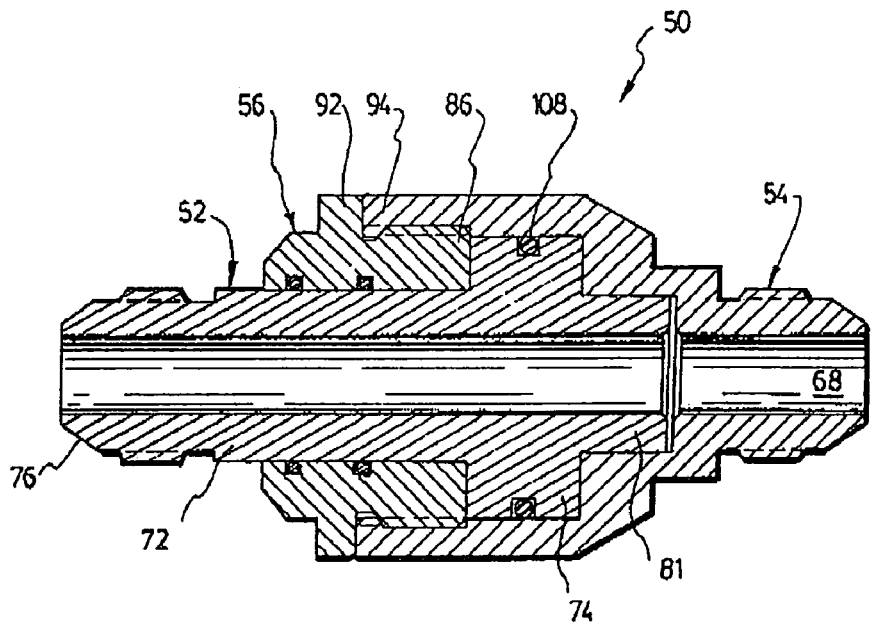
FIG. 4 is a longitudinal cut view of another embodiment of the swivelling coupling according to the present invention.

As shown in the embodiment of FIG. 13, the cavity 62 of the housing 54 preferably has one radial internal surface 58, defining a cylindrical wall of the cavity, and one axial internal surface 60 at the extremity of the cavity. Alternatively, as shown in FIG. 4, the cavity 62 has more internal surfaces (in this embodiment there are four surfaces, two axial and two radial) for cooperating with the external surfaces of the male component 52. More on this embodiment will be discussed hereinbelow.

Referring back to FIG. 13, the internal surfaces 58, 60 are preferably integrally formed with each other. This usually results from the machining of the housing 54 from a solid piece.

Briefly referring now to FIGS. 18a to 20b, another embodiment is illustrated, where the internal axial surface (character 60 in FIG. 13) consists of the external face 69 of a second male component 52b securable within the housing 54. FIG. 19 illustrates that the second male component 52b is secured within the housing 54 from the opposite end as the first male component 52a, with a second nut 56b. More regarding this preferred embodiment will be discussed hereinbelow. It should also be noted, in this vein, that the internal surfaces may arise from different components being secured together to provide the required self-lubricating and swivelling abilities.

Referring back to FIG. 13, the internal surfaces 58, 60 preferably intersect at a 90° angle, but may alternatively do so with a slight curve. Also preferably, the surfaces are provided with a very fine and smooth finish, to facilitate their slidability against corresponding surfaces of the male component principally. However, even when the finish is not perfect, containing some roughness, the surfaces become smoother through operational use, and thus may improve with time.

Figure 6:
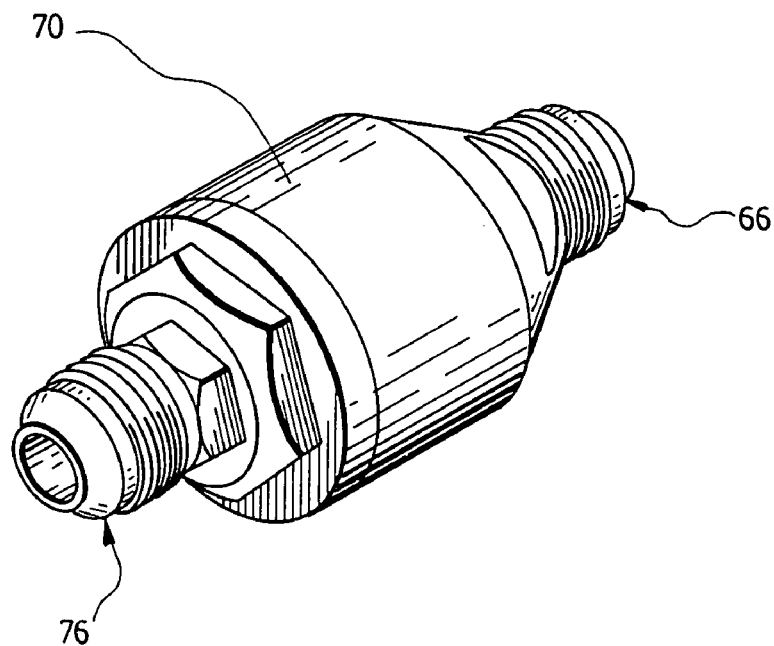
FIG. 6 is a perspective view of an embodiment of the swivelling coupling according to the present invention.

Referring now to FIG. 6, the port 66 of the housing 54 is preferably a projection type over which a line may be fastened.

Figure 7:
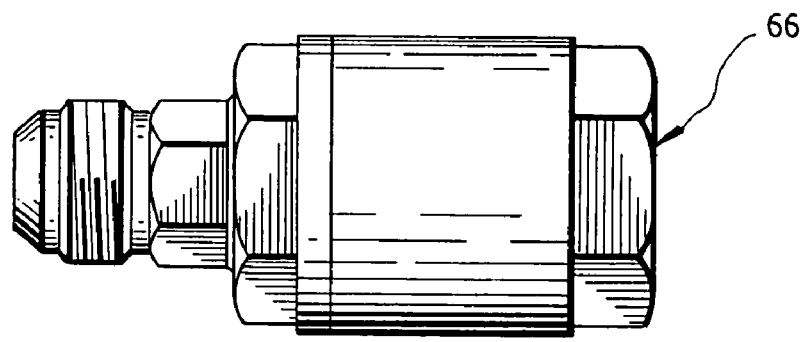
FIG. 7 is a side plan view of another embodiment of the swivelling coupling according to the present invention.

Alternatively, FIG. 7 illustrates that the port 66 may be a female type into which a line or line-adapter may be inserted. Of course, other types of ports known to a person skilled in the art may be provided.

Referring back to FIG. 6, the housing 54 has an external surface. This external surface may take on a variety of finishes and forms, such as the standard cylinder-shape in FIG. 6.

Referring to FIGS. 18a and 18b, an alternative external surface 70 shape is illustrated. This external surface 70 is circular and, when retained in a retaining ring 67, enables rotational freedom with respect to the latter.

Figure 20A:
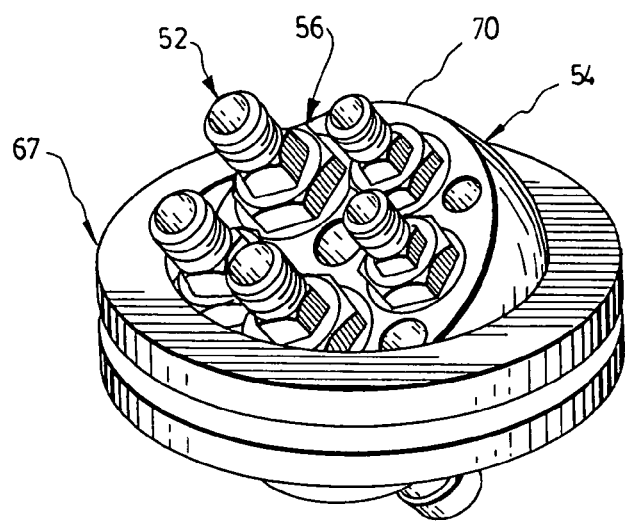
FIGS. 20a and 20b are top perspective views of the swivelling coupling according to yet another preferred embodiment of the present invention.
Figure 20B:
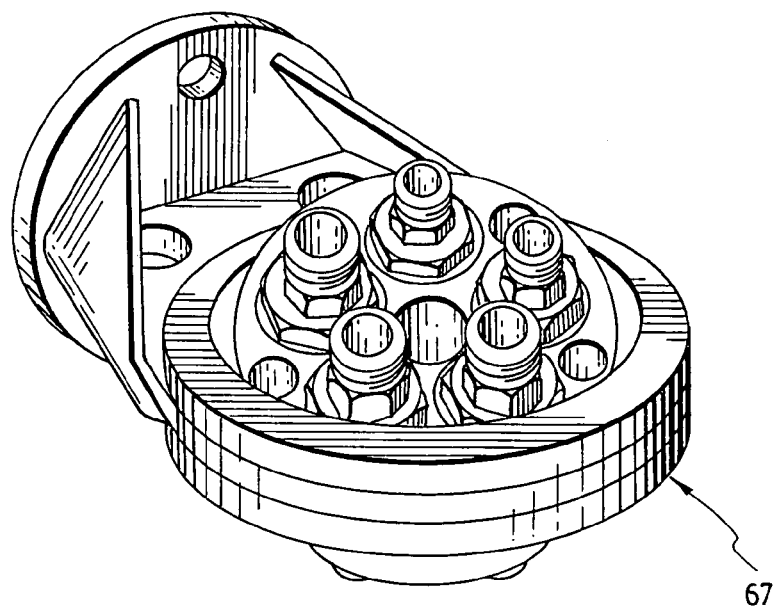

Referring now to FIGS. 20a and 20b, another alternative external surface 70 shape is illustrated. Here, the external surface 70 is spherical. The external shape of the housing does not greatly affect the internal functioning of the coupling 50, but it may offer additional and preferable functionality of the coupling 50 in operation. For instance, the spherical housing 50 may be retained within a double retaining-ring 67 which has internal spherical surfaces, thus making a spherical joint and allowing the housing 54 to have full three degrees of freedom within the retaining-ring (lateral pivoting and rotation). This complementary "spherical" swivelling ability is advantageous for a number of reasons. The retaining-ring 67 may be mounted to a bracket as shown in FIG. 20b, to be fixed to equipment, for example.

Many other types of housings which are not illustrated may also be used in connection with the present invention.

Referring back to FIGS. 3 to 5, the swivelling coupling 50 further includes a male component 52, having a bore 71 therethrough. The bore houses and/or transmits the fluid. The male component 52 includes a shank portion 72 and a flange portion 74. The flange portion 74 extends radially outward from the shank portion 72, which is preferably cylinder-shaped. The shank portion 72 has a port 76, preferably opposite the flange portion 74. There may also conceivably be a plurality of ports 76 provided on a single male component 52 and being connectable to corresponding lines.

Figure 17:
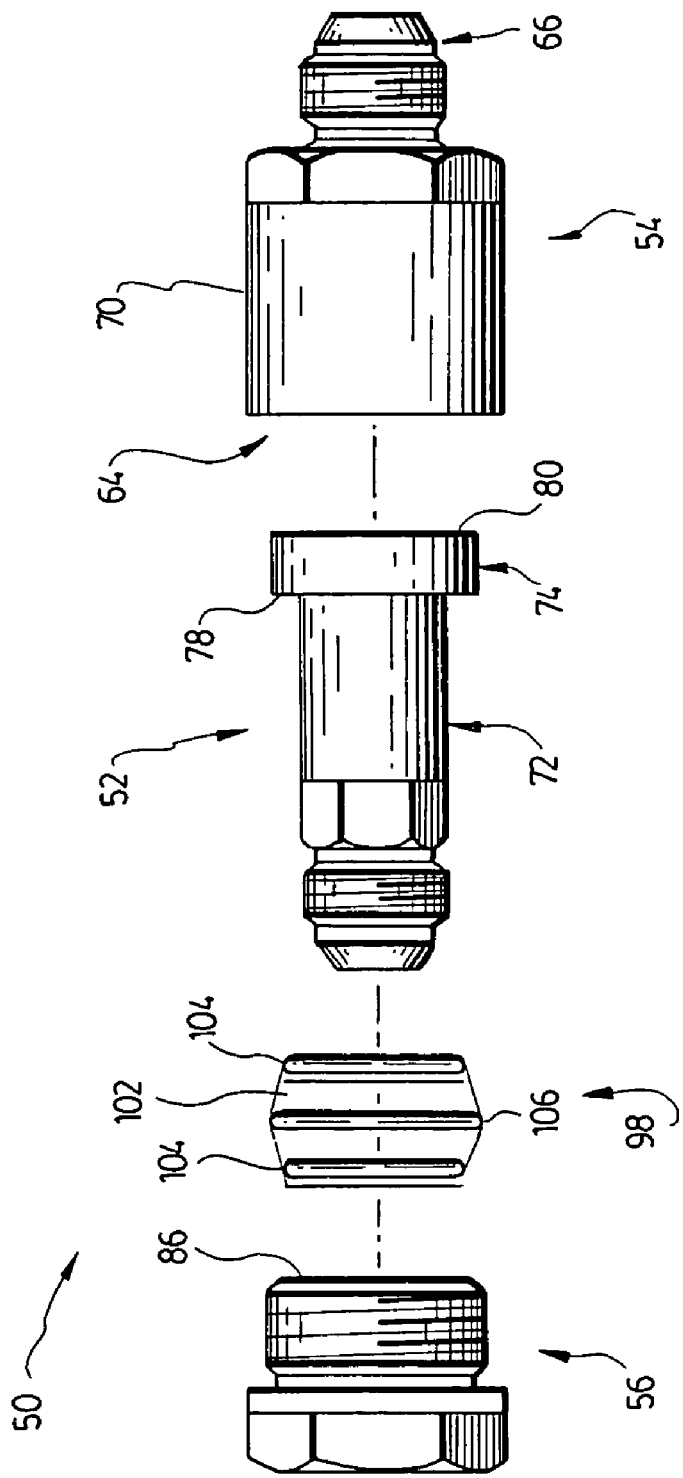
FIG. 17 is an exploded side plan view of the swivelling coupling of FIG. 6.

As shown in FIG. 17, the male component 52 is insertable into the cavity of the housing by its open end 64.

Referring back to FIGS. 3 to 5, once inserted the flange portion 74 of the male component 52 is able to cooperatively abut on the internal surfaces of the housing 54. Also, the bore 71 of the male component 52 and the bore 68 of the port 66 of the housing 54 are able to be in fluid communication. Preferably, the bores 68, 71 are collinear, as in the Figs. Alternatively, the bores may have a variety of orientations, depending on the desired application. 90° angles and oblique angles are desirable in some applications.

Figure 8:
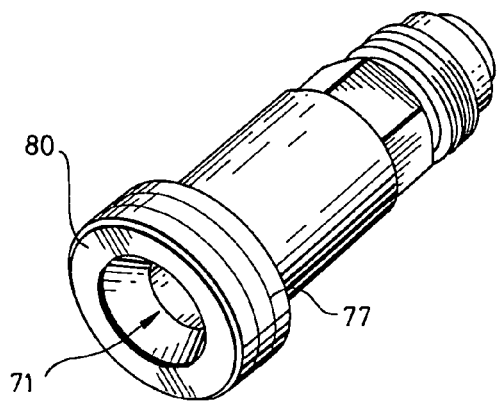
FIGS. 8 and 9 are respectively bottom and top perspective views of the male component of the swivelling coupling according to the embodiment of FIG. 3.
Figure 9:
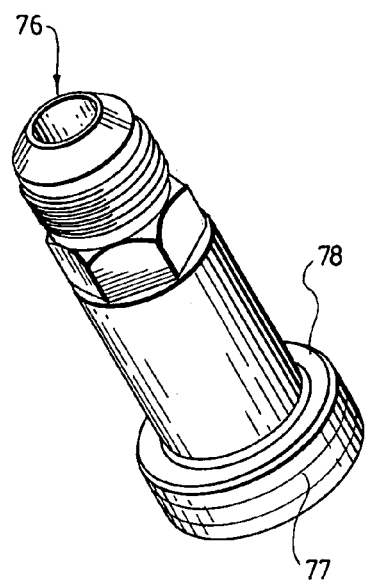
Figure 10:
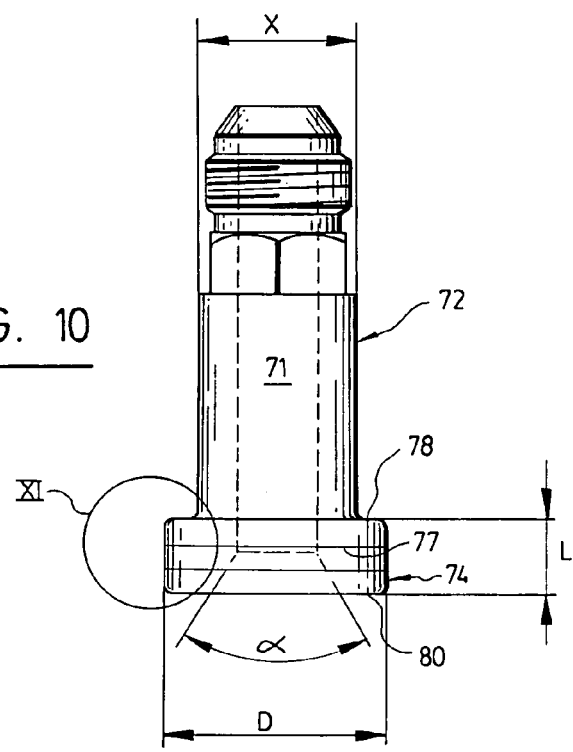
FIG. 10 is a longitudinal cut view of the male component of FIGS. 8 and 9.

Referring now to FIGS. 8 to 10, which illustrate an embodiment of the male component 52 having a T-shape, the flange portion 74 is preferably integrally formed with the shank portion 72 at the end of the shank portion 72. Also preferably, the flange portion 74 is radially continuous and symmetrical. The flange portion 74 is disk-shaped and extends at about a 90° with respect to the shank portion 72. This arrangement provides excellent support surfaces for abutting on the internal surfaces of the housing and the nut, thus distributing the forces (i.e. decreasing the pressure) in an advantageous way.

This also enables the velocity of the fluid lubricating the coupling to be cut, as the case may be in certain applications. Alternatively, the flange portion 74 may have another shape which cooperates with the internal surfaces of the housing, by being curved or angled for example, which will be further discussed hereinbelow.

The flange portion 74 preferably has an outer circumferential surface provided with at least one circumferential score 77. Preferably, there are three spaced-apart scores 77. The scores 77 facilitate the partial leaking and pressure cutting of the lubrication fluid, between the internal surfaces of the housing and the flange portion 74, and angular surface contacts.

Still referring to FIGS. 8 to 10, the flange portion 74 preferably includes first 78 and second 80 external faces in opposed and parallel relationship. The first external face 78 faces the nut (character 56 in FIG. 3) while the second external face 80 faces the axial internal surface (character 60 in FIG. 13) of the housing. Preferably, the first external face 78 of the flange portion is flat and the cooperating face of the projection of the nut is also flat. Alternatively, the corresponding nut and flange portion faces may have another form, such as convex-concave or vice versa (not illustrated), to provide good support surfaces.

It should be noted that the diameter D of the flange portion 74, and the corresponding size of the nut and housing, may be modified to obtain various different force distributions, fluid behaviour and friction coefficients between the components.

Figure 3:
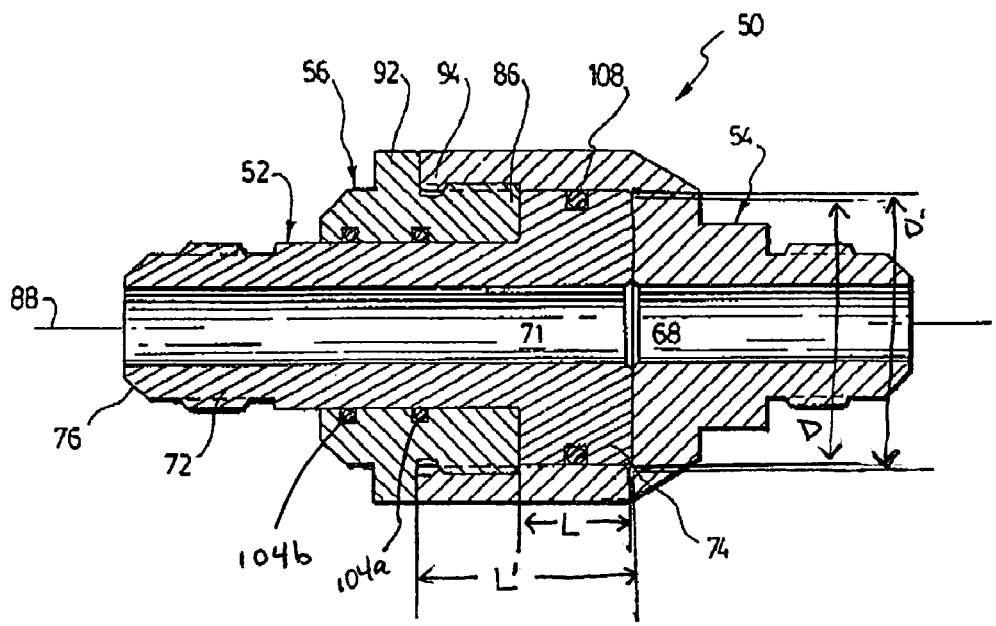
FIG. 3 is a longitudinal cut view of an embodiment of the swivelling coupling according to the present invention.
Figure 5:
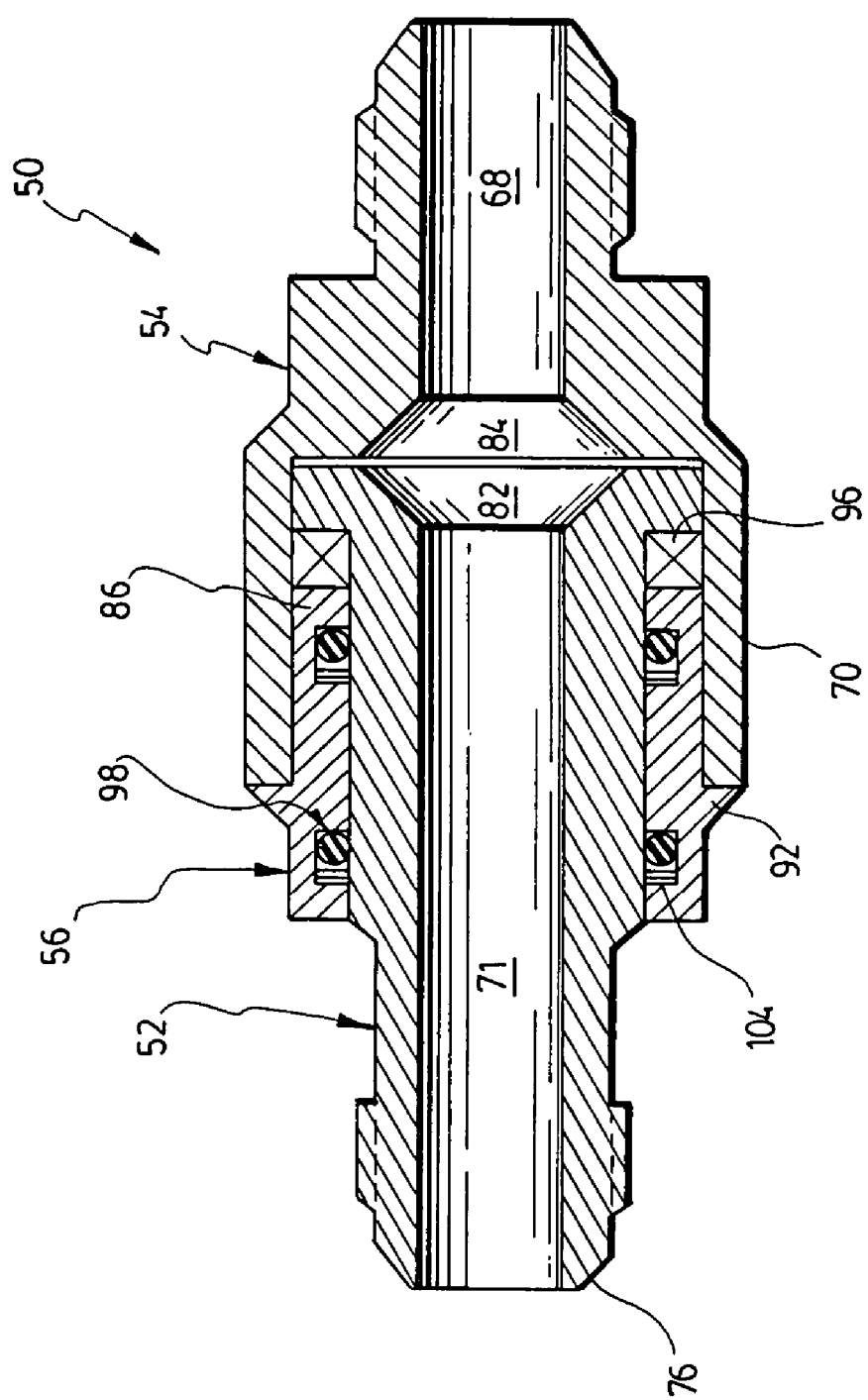
FIG. 5 is a longitudinal cut view of yet another embodiment of the swivelling coupling according to the present invention.

Referring to FIGS. 3 and 5, one embodiment is shown in which the flange portion 74 is provided on the shank portion 72 so that the male component is T-shaped in side plan view. The orientation of the internal surfaces of the housing 54 is preferably such that they substantially correspond to the T-shape of the male component 52, as illustrated.

Referring now to FIG. 4, another embodiment is shown in which the shank portion 72 further includes a segment 81 opposite the port 76 of the shank portion 72. The flange portion 74 is provided between the segment 81 and the port 76 of the shank portion 72 so that the male component is cross-shaped in plan side view. The orientation of the internal surfaces of the housing 54 is preferably such that they substantially correspond to the cross-shape of the male component 52, as illustrated.

It should nevertheless be understood that the shape of the male component 52 may be modified in a plurality of ways. The internal shape of the cavity should have a corresponding shape to house the flange portion 74, to provide support surfaces for distributing forces while allowing adequate play for lubrication and rotational movement.

Figure 21:
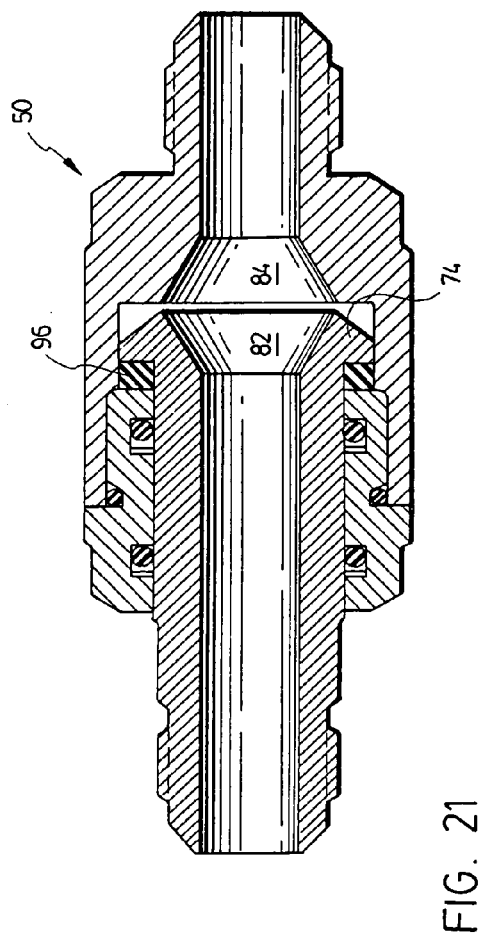
FIGS. 21 to 23 are side plan views of swivelling couplings according to other preferred embodiments of the present invention.
Figure 22:
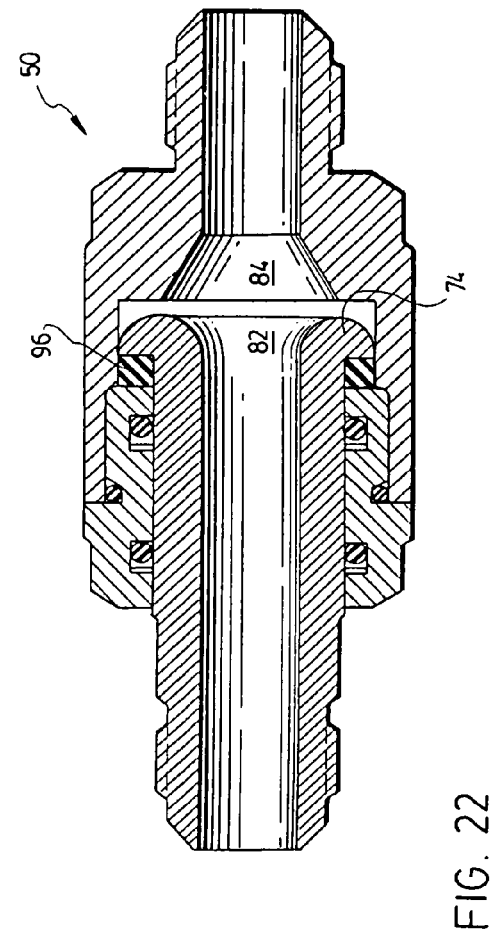
Figure 23:
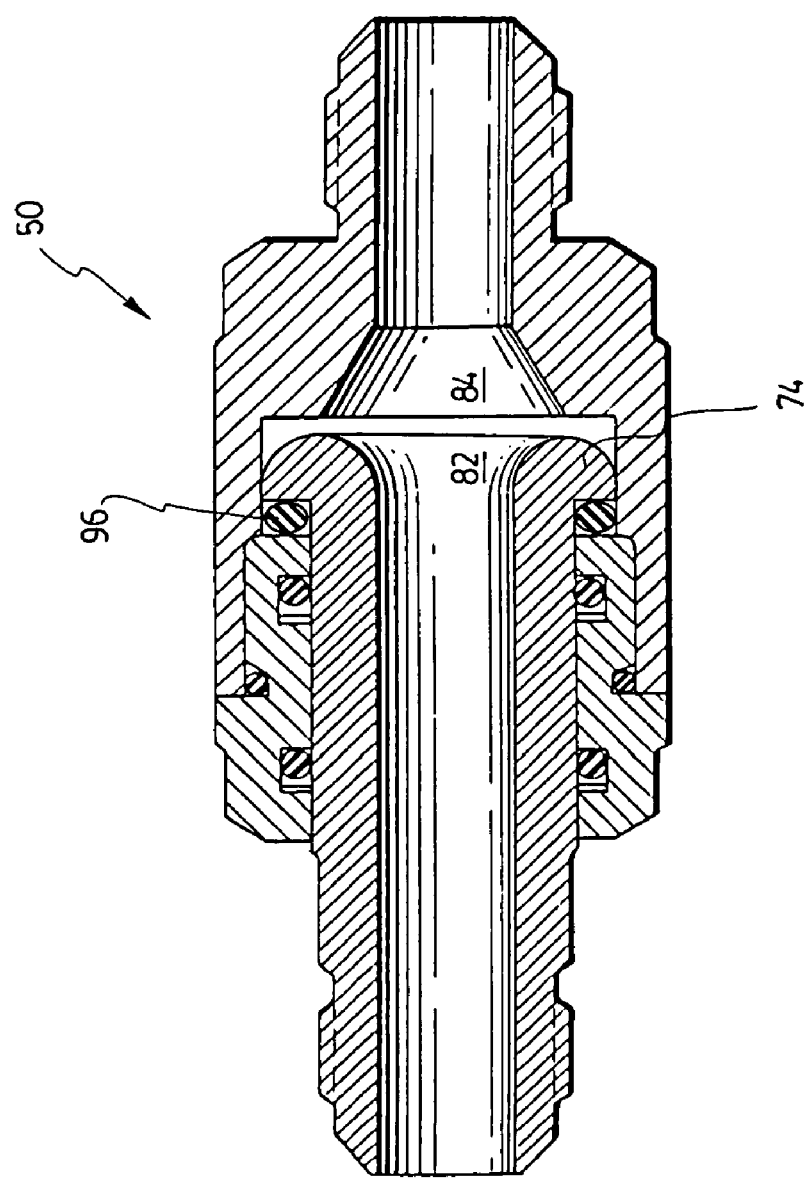

Referring to FIGS. 21 to 23, the flange portion 74 may have surfaces that are bevelled (as in FIG. 21), or curved (as in FIGS. 22 and 23). These bevelled or curved surfaces affect the fluid movement between the lubricated surfaces of the coupling and the force distribution.

Since the pressurized lubricating fluid exerts pressure perpendicularly with respect to the solid surfaces of the coupling components, by varying the angles and curvatures and surface area of the male component, different force-distribution effects may be achieved. Also, in dynamic applications, this may be particularly desired.

Referring to FIG. 5, the bore 71 of the male component 52 comprises a junction 82 which is opposed to a corresponding junction 84 of the bore 68 of the housing 54. The junctions 82, 84 are partially leakable to enable the fluid to first of all leak between the male component 52 and the axial internal surface (character 60 in FIG. 13) for lubrication. The junctions 82, 84 are preferably openly tapered with respect to each other. They are preferably frustro-conical-shaped, which still preferably has an angle α of about 60°. This shape reduces fluid turbulences and axial pushes against the nut, and facilitates the partial leaking of the fluid for lubrication.

Referring to FIGS. 21 to 23, the flange 74 and the junction 82 may have other shapes. FIGS. 22 and 23 illustrate an outwardly curved junction 82, while FIG. 21 illustrates the frustro-conical type. It should be noted that many other shapes are possible, and the two junctions 82,84 may or may not be identical.

Referring still to FIG. 5, the flange portion 74 preferably has an amount of play within the cavity of the housing so that under hydraulic fluid pressure the junctions 82, 84 enable the hydraulic fluid to leak therebetween. More on the play of the male component within the cavity will be discussed hereinbelow.

Referring now to FIGS. 3 to 5 and 17 to 23, the swivelling coupling 50 also includes a nut 56, which is securable within the cavity of the housing 54 and surrounding the shank portion 72 to radially restrain the same. Preferably, the nut surrounds the shank portion 72 from the port thereof to the flange portion, which allows for improved support, stability and resistance to forces.

Referring now to FIGS. 3 to 5, the nut also has a projection 86 extending axially and internally into the cavity of the housing 54 for axially restraining the flange portion 74, while allowing the male component 52 to rotate with respect to the housing 54 and the nut 56. The rotation occurs about a longitudinal axis 88 of the shank portion 76.

Referring to FIG. 14, the nut 56 preferably has external threads 90 and the at least one radial surface of the housing has corresponding internal threads, to secure the nut 56 within the cavity of the housing. Alternatively, these components may be unthreaded and be bolted, clamped or otherwise connected.

Referring back to FIGS. 3 to 5, the nut 56 preferably has a lip 92 extending over a perimeter rim 94 of the open end of the cavity.

Also preferably, the shank portion 72 of the male component 52 is extendable through the nut 56 so that its port 76 is located beyond the nut 56.

In a particularly preferred operational aspect of the present invention, the swivelling coupling 50 is lubricated by hydraulic fluid contained in the lines that it interconnects. The embodiments illustrated in FIGS. 5 and 17 to 23 are preferred for such applications.

In operation, the hydraulic fluid contained in the bores 68, 71 is under hydraulic pressure. Operating pressures vary depending on the application, be it heavy or light. Typical ranges of hydraulic pressure in the forestry industry, for example, are between about 50 and about 4000 psi, and up to around 5000 psi in some cases. In load-sensing hydraulic circuits, the operating pressures most often vary between about 250 psi and 3000 to 4000 psi.

In certain applications such as the forestry industry, the swivelling coupling 50 is preferably used in hydraulic systems that are load-sensing (also called "shock") circuits. In these circuits, hydraulic pressure is sent to match the load requirement. There is therefore an ebb and flow of hydraulic fluid in and out of the interstices of the swivelling coupling 50. When the pressure is high the fluid pushes the male component against the nut, and when it is low the male component experiences more "freedom" within the cavity. The torque required during low fluid pressure is decreased. The swivelling coupling 50 of the present invention is particularly suited for load-sensing hydraulic circuits. At low pressures, the torque required for swivelling is quite low, which enables the interconnected lines to be displaced, rotated, etc. At operational pressures, such as around 3000 to 4000 psi for many machines, the torque required for rotation is high enough that very little rotation is possible. It should be understood, however, that in high-load operation there is usually little need for high rotation capacity, but moreover a great need for good force distribution between the nut and the male component. The swivelling coupling provides excellent force distribution and its components are not easily adversely affected.

Figure 11:
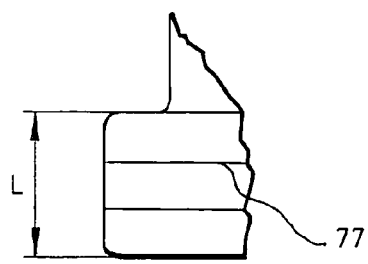
FIG. 11 is a close up view of area XI of FIG. 10.
Figure 12:
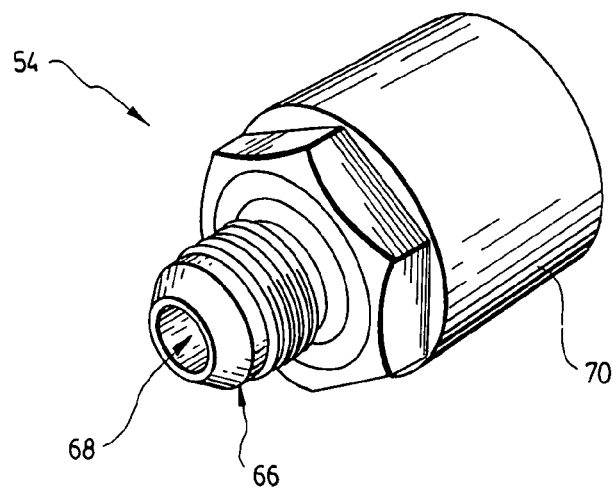
FIG. 12 is a perspective view of the housing of the swivelling coupling according to a preferred embodiment of the present invention.

Referring to FIG. 11, and as also shown in FIG. 3, this partial leaking is facilitated by the radial and axial play of the flange portion 74 within the cavity. More specifically, the flange portion 74 preferably has a diameter D and a width L.

Referring still to FIG. 11 while also to FIGS. 13 and 15, and as also shown in FIG. 3, the cavity 62 of the housing 54 has an internal depth of L', and the insertion portion of the nut 52 has a length of L". The internal depth L' of the cavity is slightly greater than the sum of L' and L", thus enabling an amount of axial play. Preferably, the amount of axial play is between about 0.005 and about 0.08 inches. Still preferably, the amount of axial play is between about 0.03 and about 0.08 inches.

Referring still to FIG. 10 while also to FIG. 13, and as also shown in FIG. 3, the cavity 62 of the housing 54 has an internal diameter D', which is slightly greater than the diameter D of the flange. Consequently, the radial play is approximately D'-D. Preferably the radial play is between about 0.005 and about 0.08 inches. Still preferably, the amount of radial play is between about 0.015 and about 0.03 inches.

Referring to FIG. 5, under hydraulic pressure, the hydraulic fluid leaks in between the junctions 82, 84 into the interstices of the coupling 50. Depending on the design and orientation of the flange portion 74 and internal surfaces of the housing 54, and thus the axial play and the radial play, as well as the operating pressure and a myriad of other variables, the hydraulic fluid will partially leak between the male component 52 and the internal surfaces.

Referring to FIGS. 10 and 15, the shank portion 72 of the male component 52 has a diameter X that is slightly smaller than the diameter X' of the nut 56. The preferred range of the tolerance X'-X is between about 0.002 and about 0.015, still preferably between about 0.002 and about 0.005 inches, but may be modified as well. For instance, this tolerance may be that recommended by an O-ring manufacturer for a given application and coupling dimensions.

Referring generally to FIGS. 3 to 5, the hydraulic pressure pushes the male component 52 axially toward the nut 56.

Referring particularly to the embodiments in FIGS. 5, 21 to 23, once pressurized, the pressure inside the housing 54 is substantially uniform in all directions and pushes perpendicularly on the surfaces. The pushing of the flange portion 74 on the nut 56 is thus approximately the differential between the front and back surfaces of the flange portion 74. Accordingly, the pushing may be varied, in certain applications, by modifying the dimensions and/or angles of the surfaces.

In the embodiments shown in FIGS. 3 and 4, this pressure results in the direct abutment of the flange portion 74 against the projection 86 of the nut 56. These embodiments are more preferred for low pressure applications or non-hydraulic applications.

In the embodiment shown in FIG. 5, the swiveling coupling 50 further includes a slide-ring 96 surrounding the shank portion 72 and disposed between the nut 56 and the first external face of the flange portion 74. This slide-ring 96 reduces the friction coefficient between the components, most notably between the flange portion 74 and the nut 56.

The slide-ring 96 is particularly desirable in high-pressure hydraulic systems (or alternatively in applications where the fluid is less lubricating) since the axial pressure on the male component 52 greatly increases the friction between the flange portion 74 and the nut 56. Preferably, the slide-ring 96 is composed of NYLATRON® NSM nylon material group, NYLOIL™ nylon plastic material, NYCAST™ nylon plastic material, TEFLON® fluoropolymers, Ceramic or another suitable material for such a component. Alternatively or additionally, an extra lubricant may be added between the flange portion 74 and the projection 86 of the nut 56.

FIG. 5 illustrates that under internal fluid pressure the flange portion 74 is pushed toward the projection 86 of the nut 56, and thus abuts on the slide-ring 96. The slide-ring 96 differs greatly in its functionality and advantageousness when compared to the ball- and needle-bearings of the prior art. The ball- and needle bearings suffer from high, focalized pressure points. The slide-ring 96, on the contrary, enables a distribution of forces decreasing the pressure between the components, which is in line with the present invention. This enables the swivelling coupling 50 to have improved swivelling performance at higher pressures in the range of 3000 to 5000 psi for example. Preferably, the slide-ring 96 has a flat disk shape, but may also have an O-ring shape to reduce the coefficient of friction.

It should be noted that when the flange portion 74 is pressed against the nut 56 directly (as in FIGS. 3 and 4) or against the slide-ring (as in FIG. 5), the second external surface of the flange portion 74 is held in spaced relation to the internal axial surface of the housing 56, and corresponds to the amount of axial play. Also, in some applications, a barrier may be formed by the contact between the nut 56 and the flange portion 74, to thereby partially or substantially hinder the flow of the fluid therebeyond.

Referring still to FIG. 5, the swivelling coupling 50 preferably further includes at least one seal-unit 98. The seal-unit 98 is preferably a sealing ring, composed of a polymer material, which cooperates with the nut 56, between the same and the shank portion 72.

FIG. 17 best illustrates the preferred seal-unit 98, not yet assembled within the coupling.

It should be noted that the barrier created by the contact between the nut and the flange portion may help protect the seal-unit 98 from hydraulic shocks (also called "hydraulic rams") or other types of fluid shocks in the coupling.

Referring to FIG. 15, the nut 56 preferably includes at least one internal annular groove 100, preferably two such grooves 100, so that the corresponding rings of the seal-unit 98 are partially insertable therein.

Referring to FIG. 17, the seal-unit 98 preferably includes an annular portion 102 composed of plastic material, and two rings 104 forming first and second sealing joints, respectively, disposed radially around the opposite ends of the annular portion 102. In this case, the nut 56 further includes two internal annular grooves 100 so that the two rings 104 are respectively partially insertable therein. This is illustrated in FIG. 5. Similar sealing joints are also shown in FIG. 3 as first sealing joint 104a and second sealing joint 104b.

A close-up of the groove 100 is shown in FIG. 16.

Referring to FIG. 5, once the coupling 50 is assembled and in operation, the seal-unit 98 is pressed in between the shank portion 72 and the nut 56 to cut the pressure of any fluid leaking through the interstices of the coupling 50. Being disposed around the shank portion 72, the seal-unit 98 facilitates the sealing of the coupling 50 while allowing the internal lubrication thereof.

The seal-unit 98 preferably acts as a "fluid-tight" joint stopping the lubricating fluid from leaking out of the coupling. Thus, the seal-unit 98 may include O-rings, back-up rings, etc. Also, the seal-unit 98 may be easily replaced, in the event that it loses its efficiency.

Referring to FIGS. 3 and 4, an additional sealing joint 108 may also be arranged between the male component 52 and the radial surfaces of the housing 54, for lubrication purposes between the male component 52 and the housing 54. This joint 108 may be a snap-ring, a square joint, or another type of joint or connection point. In fact, the specific joint choice depends on various operating conditions and design specifications, and therefore may be chosen by a person skilled in the art. Also, the joint may be provided in a groove of the flange, to provide a fissure, crack or opening through which the fluid is permitted to partially leak to help lubricate the coupling.

Various sealing joints may be used to cut the velocity of the fluid so that if the fluid leaks past one of the seals, it is less likely to leak past the next seal. Thus a series of seals may be used and designed by a person skilled in the art.

The swivelling coupling employs a "sealing" technique, including the seal-unit 98 and possibly other seals, to ensure adequate lubrication while avoiding external leaks. The sealing technique, which may be called a "labyrinthine" technique, enables a reduction of the overpressure (overloading pressures) that may be destructive to the sealing by slowing the displacement of the fluid toward the seals, thereby increasing the longevity and the durability of the same. As was described above, the velocity of the lubricating fluid is advantageously cut and diminished as the fluid is forced to run into a variety of walls, surfaces, scores, joints, angles, small openings, or other "obstacles", before it reaches the end of the coupling. In a number of embodiments and applications, a barrier is formed by the contact between the nut and the flange portion, before the seal-unit 98, to slow the fluid before and aid in the sealing. In some embodiments and applications, therefore, as the fluid is pushed through these obstacles, it lubricates the interior while losing velocity, and so cannot escape or leak out of the coupling.

Furthermore, the technique of using "progressive sealing" (a series of sealing points) coupled with the arrangement of the components provides efficiencies for a variety of applications. As touched on hereinabove, the series of seals "progressively" cuts the velocity of the fluid and eventually seals the fluid within the coupling, very efficiently.

For example, in high pressure situations, there are preferably two back-up rings and two O-rings for sealing, after the barrier formed by the contact between the nut and the flange portion.

It should be noted that depending on the desired application, a variety of sealing techniques may be used. When the lines transmit fluid at a given flow rate, the sealing technique must deal with the fluid velocity; whereas when there is a given constant fluid pressure but no flow, the sealing technique should be provided to handle the given pressure.

Referring to FIGS. 18a to 20b, another preferred embodiment of the swivelling coupling 50 includes a plurality of male components 52 and nuts 56, which are combined with an adapted spherical or circular housing 54. As was mentioned hereinabove, the back face 69 of the second male component 52b acts as the internal axial surface of the housing 54 with respect to the first male component 52a, and vice versa. In this embodiment, the amount of axial play provided to the male components 52a,52b depends on the distance between the projections 86a,86b and the widths of the flange portions 74a,74b, once installed in the housing 54. This "double"

swivelling coupling provides certain advantages with respect to its swivelling ability, adaptability and functionality.

It should therefore be apparent that the embodiments of FIGS. 3 to 7 and 17 enable the rotation of the male component 52 with respect to the housing 54 and nut 56 along a longitudinal axis; that the embodiment of FIG. 19 enables the independent rotation of two coaxial male components 52a, 52b with respect to the housing 54 and nuts 56a,56b; and that the embodiments of FIGS. 18a, 18b, 20a and 20b enable the independent rotation of a plurality of adjacent male components along spaced-apart and parallel axes. Alternatively, male components could be arranged in a single housing in order to each rotate about an axis that is parallel and/or non-parallel to the other rotation axes.

Materials of Construction

The components of the swivelling coupling 50 may be composed of various materials. In a preferred embodiment, the male component 52, housing 54 and nut 56 are composed of carbon steel. Stainless steel or other metallic alloys may also be used. Alternately, these components may be made of a polymer material, especially one bestowing low friction properties for ease of rotation. Examples of such materials are some 6/6 Nylons, and more particularly the NYLATRON® NSM nylon material group.

In high-pressure applications, such as in the forestry industry or heavy hydraulic systems, the swivelling couplings are preferably composed of a non corroding metal, such as stainless steel, which may preferably be plated with zinc or nickel. The metal may be treated to provide hardness characteristics, and other desirable properties.

The back-up rings are preferably composed of PTFE and the O-rings are preferably composed of Nitrile. The slide-ring is preferably composed of the NYLATRON® NSM nylon material group.

In chemical industries such as the petrochemical industry, a variety of fluids—hydrocarbons, acids, bases, viscous or Newtonian liquids, etc—may be transported in ducts within a refinery, plant, within or around reactors or transport vehicles. Depending on the chemical properties of the fluid, the swivelling coupling's materials may be selected to resist or prevent reactions, degradation, rust, wearing and/or external leakage, as the case may be.

In addition, the support surfaces inside the swivelling coupling may be specially treated or coated to bestow thereupon low friction properties. Precision smoothing or providing a layer of material susceptible to ultra-fine smoothness may confer improved properties in swivelling ability, especially at high fluid pressures.

Manufacture of the Swivelling Couplings

The swivelling couplings 50 of the present invention may be manufactured by a variety of processes, mostly depending on the material of construction and the intended end-use industry.

By way of example, the forestry industry requires swivelling couplings to interconnected hydraulic ducts in order to pressurize a variety of feller-heads, articulation arms, rotation and tilting mechanisms, booms, among other equipment. Shock hydraulic systems are frequently used for such equipment, and the pressures involved range from 50 to 4000 psi, and sometimes up to 5000 psi for some equipment. In these applications, carbon steel is preferably machined at high precision to manufacture the male component, housing and nut of the coupling.

As another example, in the transmission of water or other low viscosity fluids, the swivelling couplings may be made from lighter weight materials as the operating pressures are often much lower than in heavy hydraulic systems. Plastic materials may be machined or securely fastened together to construct the couplings.

A plurality of durability treatment processes may be used to increase the durability and/or hardness of the product by accentuating the durability of the surfaces (hardness, smoothness, elasticity, porosity, other properties known to a skilled workman, etc.). Different techniques of treating the materials can be used in accordance with and depending on the application or the fluid to be used. Under certain pressures, the fluid (hydraulic fluid or pre-applied lubricant) may easily ensure the required lubrication in order to avoid premature wearing of the components. The swivelling coupling enables an increase in the rubbing surfaces of the internal parts as well as the internal lubrication, without increasing the volume of the pieces in play.

In summary, some common industries and applications for the swivelling coupling according to the present invention are forest equipment, pulp and paper equipment, utility equipment, heavy mobile vehicles such as refuse trucks, injection molding equipment, steel mill equipment, hose reels, and many more.

Of course, numerous modifications could be made to the embodiments described herein and illustrated in the drawings, without departing from what has actually been invented.

The invention claimed is:

1. A ball-bearingless and needle-bearingless self-lubricating swivelling coupling for providing a swivellable interconnection in a load-sensing hydraulic circuit between first and second hydraulic lines containing a hydraulic fluid which provides lubrication, the swivelling coupling comprising:
a housing comprising:
internal surfaces comprising at least one radial surface and at least one axial surface, said internal surfaces defining a cavity having an open end; and
a port having a bore therethrough in fluid communication with the cavity, the port being connectable to the first line;
a male component having a bore therethrough, the male component comprising: a shank portion having a port connectable to the second line; and
a flange portion extending radially outward from the shank portion, the male component being insertable within the cavity of the housing to enable the flange portion to cooperate with the at least one radial surface, and to enable the bore of the male component and the bore of the port of the housing to be in fluid communication, the flange allowing a leak so that the fluid from the bores is partially leaked between the flange and the internal surfaces; and
a nut securable within the cavity of the housing and surrounding the shank portion to radially restrain the same, the nut having a projection extending axially and internally into the cavity for axially restraining the flange and allowing the leak between the flange and the housing internal surfaces, the nut also allowing the male component to rotate with respect to the housing and the nut about a longitudinal axis of the shank portion, thereby enabling the first and second lines to be swivellably interconnected; and
a first sealing element partially housed in the nut and provided between and abuttable against the male component and the projection of the nut, and a second sealing element partially housed in the nut and provided between and abuttable against the shank portion and the nut, the first sealing element being in between the second sealing element and the flange portion so that the leak creates a first pressurized interstitial region between the bores and the first sealing element, and also creates a second pressurized interstitial region between the first and second sealing elements, such that the first and second pressurized interstitial regions experience an ebb and flow of the hydraulic fluid in response to variations in hydraulic pressure in the load- sensing hydraulic circuit.

2. The coupling of claim 1, wherein the flange portion is integrally formed with the shank.

3. The coupling of claim 2, wherein the flange portion is radially continuous and symmetrical.

4. The coupling of claim 3, wherein the flange portion is solid and disk-shaped and extends at about 90° with respect to the shank portion.

5. The coupling of claim 4, wherein the flange portion has first and second external faces in opposed and parallel relationship, the first external face facing the projection of the nut and the second external face facing the internal axial surface of the housing.

6. The coupling of claim 5, wherein the bore of the male component and the bore of the housing each comprise an internal fluid junction that is opposed to the corresponding other junction, and wherein the flange portion has an amount of axial play within the cavity.

7. The coupling of claim 6, wherein under fluid pressure the first external face presses directly against the projection of the nut while being rotationally slidable with respect thereto, and the second external face is held in spaced relation to the internal axial surface.

8. The coupling of claim 7, wherein the projection of the nut and the first external face of the flange portion contact to form a fluid barrier to hinder the leak of the fluid therebeyond.

9. The coupling of claim 4, wherein the flange portion has an amount of radial play within the cavity to facilitate lubrication and rotation.

10. The coupling of claim 9, wherein the amount of radial play is between about 0.005 and about 0.08 inches.

11. The coupling of claim 10, wherein the amount of radial play is between about 0.015 and about 0.03 inches.

12. The coupling of claim 4, wherein the internal axial surface of the housing is symmetrical and annular.

13. The coupling of claim 6, wherein the amount of axial play is between about 0.005 and about 0.08 inches.

14. The coupling of claim 13, wherein the amount of axial play is between about 0.03 and about 0.08 inches.

15. The coupling of claim 6, wherein the internal fluid junction of the bore of the male component faces axially.

16. The coupling of claim 15, wherein the bore of the housing extends axially and linearly away from the internal fluid junction thereof.

17. The coupling of claim 1, wherein the flange is provided on the shank portion so that the male component is T-shaped in side plan view.

18. The coupling of claim 1, wherein the shank portion is cylinder-shaped.

19. The coupling of claim 1, wherein the bore of the male component and the bore of the housing are collinear.

20. The coupling of claim 1, wherein the nut comprises external threads and the at least one radial surface comprises corresponding internal threads, to secure the nut within the cavity of the housing.

21. The coupling of claim 1, wherein the open end of the cavity has a perimeter rim and the nut comprises a lip abuttable over said perimeter rim.

22. The coupling of claim 21, wherein the first and second sealing element joint are located on either side of the lip of the nut.

23. The coupling of claim 1, wherein the shank portion of the male component is extendable through the nut so that the port of the shank portion is located beyond the nut.

24. The coupling of claim 1, wherein the nut surrounds the shank portion from the port thereof to the flange portion.

25. The coupling of claim 1, wherein the internal radial and axial surfaces of the housing are integrally formed.

26. The coupling of claim 1, wherein the flange portion comprises an outer circumferential surface, said outer circumferential surface being provided with at least one circumferential score.

27. The coupling of claim 20, wherein the first and second ports are aligned to enable the first and second lines to be collinear.

28. The coupling of claim 1, wherein the first sealing element joint is abuttable around the shank portion and against the projection of the nut.

29. The coupling of claim 28, wherein the first sealing element joint is located at least partially within the cavity of the housing and the second sealing element joint is located beyond the cavity of the housing.

30. The coupling of claim 29, wherein the first and second sealing elements units are separate sealing rings.

31. The coupling of claim 1, further comprising an additional sealing element provided between and abuttable against the male component and the internal surfaces of the housing, the additional sealing element being located in between the first sealing element and an interface of the bores; so as to divide the first pressurized interstitial region into a primary interstitial region defined in between the interface of the bores and the additional sealing element and a secondary interstitial region defined in between the additional sealing element and the first sealing element.

32. The coupling of claim 1, wherein the first sealing element joint includes at least one ring, and the nut further includes at least one internal annular groove so that the at least one ring is partially insertable therein.

33. A sub-assembly mountable within a housing for making a ball-bearingless and needle-bearingless self-lubricating swivelling interconnection in a load-sensing hydraulic circuit between first and second hydraulic lines containing a hydraulic fluid which provides lubrication, the housing having internal surfaces including at least one radial surface and at least one axial surface, the internal surfaces defining a cavity having an open end; and a port having a bore therethrough in fluid communication with the cavity, the port being connectable to the first line, the sub-assembly comprising:

a male component having a bore therethrough, the male component comprising:
a shank portion having a port connectable to the second line; and
a flange portion extending radially outward from the shank portion, the male component being insertable within the cavity of the housing to enable the flange portion to cooperate with the at least one radial surface, and to enable the bore of the male component and the bore of the port of the housing to be in fluid communication, the flange allowing a leak so that the fluid from the bores bore is partially leaked between the flange and the internal surfaces; and a nut surrounding the shank portion to radially restrain the same, the nut being securable within the cavity of the housing and having a projection extendable axially and internally into the cavity for axially restraining the flange and allowing the leak between the flange and the housing internal surfaces, the nut also allowing the male component to rotate with respect to the housing and the nut about a longitudinal axis of the shank portion, when the subassembly is mounted within the housing, thereby enabling the first and second lines to be swivellably interconnected; and a first sealing element partially housed in the nut and provided between and abuttable against the male component and the projection of the nut, and a second sealing element partially housed in the nut and provided between and abuttable against the shank portion and the nut, the first sealing element being in between the second sealing element and the flange portion so that the leak creates a first pressurized interstitial region between the bores and the first sealing element and also creates a second pressurized interstitial region between the first and second sealing elements, such that the first and second pressurized interstitial regions experience and ebb and flow of the hydraulic fluid in response to variations in hydraulic pressure in the load- sensing hydraulic circuit.

34. The sub-assembly of claim 33, wherein the flange portion is integrally formed with the shank.

35. The sub-assembly of claim 34, wherein the flange portion is radially continuous and symmetrical.

36. The sub-assembly of claim 35, wherein the flange portion is solid and disk-shaped and extends at about 90° with respect to the shank portion.

37. The sub-assembly of claim 36, wherein the flange portion has first and second external faces in opposed and parallel relationship, the first external face facing the projection of the nut and the second external face facing the internal axial surface of the housing when the sub-assembly is mounted therein.

38. The sub-assembly of claim 37, wherein the bore of the male component comprises an internal fluid junction and the flange portion has an amount of axial play within the cavity.

39. The sub-assembly of claim 38, wherein the internal fluid junction faces axially.

40. The sub-assembly of claim 36, wherein the flange portion has an amount of radial play within the cavity to facilitate lubrication and rotation.

41. The sub-assembly of claim 40, wherein the amount of radial play is between about 0.005 and about 0.08 inches.

42. The sub-assembly of claim 41, wherein the amount of radial play is between about 0.015 and about 0.03 inches.

43. The sub-assembly of claim 38, wherein under fluid pressure the first external face presses directly against the projection of the nut while being rotationally slidable with respect thereto, and the second external face is held in spaced relation to the internal axial surface.

44. The sub-assembly of claim 38, wherein the amount of axial play is between about 0.005 and about 0.08 inches.

45. The sub-assembly of claim 44, wherein the amount of axial play is between about 0.03 and about 0.08 inches.

46. The sub-assembly of claim 33, wherein the flange is provided on the shank portion so that the male component is T-shaped in side plan view.

47. The sub-assembly of claim 33, wherein the shank portion is cylinder-shaped.

48. The sub-assembly of claim 33, wherein the flange portion comprises an outer circumferential surface, said outer circumferential surface being provided with at least one circumferential score.

49. The sub-assembly of claim 33, wherein the bore of the male component is linear and extends parallel to the shank portion.

50. The sub-assembly of claim 33, wherein the nut comprises external threads to secure the nut within the cavity of the housing.

51. The sub-assembly of claim 33, wherein the nut comprises a lip abuttable over the housing.

52. The sub-assembly of claim 33, wherein the shank portion of the male component is extended through the nut so that the port of the shank portion is located beyond the nut.

53. The sub-assembly of claim 33, wherein the nut surrounds the shank portion from the port thereof to the flange portion.

* * * * *